(12) United States Patent
Thompson et al.

(10) Patent No.: US 6,759,664 B2
(45) Date of Patent: Jul. 6, 2004

(54) ULTRAVIOLET CURING SYSTEM AND BULB

(75) Inventors: Justin Thompson, Huntersville, NC (US); Olivier Schuepbach, Hickory, NC (US)

(73) Assignee: Alcatel, Paris (FR)

( * ) Notice: Subject to any disclaimer, the term of this patent is extended or adjusted under 35 U.S.C. 154(b) by 503 days.

(21) Appl. No.: 09/739,670

(22) Filed: Dec. 20, 2000

(65) Prior Publication Data

US 2004/0061079 A1 Apr. 1, 2004

(51) Int. Cl.$^7$ .................. G01N 21/06; G01N 21/00; B05D 5/06; B05D 5/00
(52) U.S. Cl. ............... 250/492.1; 250/455.11; 250/432 R; 250/435; 250/436; 250/437; 427/513; 427/163.2; 422/24; 313/634
(58) Field of Search .................. 250/492.1, 455.11, 250/435–437, 432 R; 427/513, 163.2; 422/24; 313/634

(56) References Cited

U.S. PATENT DOCUMENTS

| | | | | |
|---|---|---|---|---|
| 3,926,556 A | * | 12/1975 | Boucher ................. | 422/21 |
| 4,100,418 A | * | 7/1978 | Brown, Jr. ............. | 250/505.1 |
| 4,636,405 A | * | 1/1987 | Mensah et al. ......... | 427/493 |
| 4,837,484 A | * | 6/1989 | Eliasson et al. ........ | 313/634 |
| 5,067,831 A | * | 11/1991 | Robbins et al. ........ | 385/123 |
| 5,150,705 A | * | 9/1992 | Stinson .................. | 607/94 |
| 5,173,638 A | * | 12/1992 | Eliasson et al. ........ | 313/634 |
| 5,221,387 A | * | 6/1993 | Robbins et al. ........ | 156/85 |
| 5,295,750 A | | 3/1994 | Tanuma et al. | |
| 5,433,738 A | * | 7/1995 | Stinson .................. | 607/92 |
| 5,444,331 A | * | 8/1995 | Matsuno et al. ........ | 313/553 |
| 5,581,152 A | * | 12/1996 | Matsuno et al. ........ | 313/634 |
| 5,614,723 A | | 3/1997 | Oppenlander et al. | |
| 5,763,003 A | | 6/1998 | Bonicel et al. | |
| 5,827,611 A | * | 10/1998 | Forbes .................. | 428/375 |
| 5,828,071 A | | 10/1998 | Bourghelle et al. | |
| RE36,157 E | * | 3/1999 | Robbins et al. ........ | 156/85 |
| 6,351,070 B1 | * | 2/2002 | Barry .................... | 315/39 |
| 6,419,749 B1 | * | 7/2002 | Rhoades ................ | 118/641 |
| 2002/0012252 A1 | * | 1/2002 | Carter et al. .......... | 362/558 |
| 2002/0155229 A1 | * | 10/2002 | Rhoades ................ | 427/558 |

FOREIGN PATENT DOCUMENTS

| | | | |
|---|---|---|---|
| DE | 39 13519 A1 | 10/1990 | |
| EP | 1 088 638 A2 | 4/2001 | |
| EP | 1216968 A1 | * 6/2002 | ........ C03C/25/12 |

OTHER PUBLICATIONS

Patent Abstracts of Japan, Publication No. 61058840, Mar. 26, 1986, Furukawa Electric Co., Ltd.

* cited by examiner

Primary Examiner—John H. Lee
Assistant Examiner—Bernard Souw
(74) Attorney, Agent, or Firm—Sughrue Mion, PLLC

(57) ABSTRACT

The present invention is an apparatus for curing an article that is passing through the apparatus, wherein the article is being cured by ultraviolet radiation curing. The present invention most commonly applies to the field of fiber optics, and the manufacture of optical fibers and fiber optic cables or ribbons. The present invention comprises a hollow tubular UV light emitting device (bulb) and a UV transparent tube where the bulb is disposed around the tube creating a space between the tube and the bulb. The article to be cured passes through the center of the tube along with an inert gas, where the inert gas is either cooled or heated depending on the application of the apparatus. A UV transparent cooling medium is passed through the space between the tube and the bulb to provide cooling for the apparatus, preventing heat damage from the bulb. Shielding coatings are employed on either the surface of the tube or the inner surface of the bulb to prevent harmful and unwanted radiation from the bulb from reaching the article to be cured. Further, a dichroic reflector is employed outside of the bulb to reflect UV radiation back into the bulb while allowing other radiation emitted by the bulb to escape, while the exterior of the bulb is being cooled by an additional cooling medium passing over the exterior of the bulb. The present invention greatly improves temperature control and operational efficiency of the UV curing process over prior art devices.

56 Claims, 3 Drawing Sheets

ULTRAVIOLET CURING SYSTEM AND BULB

BACKGROUND OF THE INVENTION

1. Field of the Invention

The present invention generally relates to the field of optical fibers, in particular the present invention is directed to a new and novel method and apparatus for curing optical fibers with ultraviolet radiation.

2. Discussion of Related Art

Optical fibers are very small diameter glass strands which are capable of transmitting an optical signal over great distances, at high speeds, and with relatively low signal loss as compared to standard wire or cable networks. The use of optical fibers in today's technology has developed into many widespread areas, such as: medicine, aviation, communications, etc. Because of this development, there is a growing need to produce optical fibers of better quality at faster rates and lower costs.

Many of the areas of use for optical fibers, such as communications, require the optical fibers be protected from various destructive elements, such as adverse weather, moisture, impact damage, etc. This protection for the individual fibers comes from the fiber coatings. Today, most optical fibers have two coatings, which are often referred to as the primary and secondary coatings. The primary coating is applied onto the surface of the optical fiber, with the secondary coating being applied on top of the primary coating. The main function of the primary coating is to provide a soft "cushion" for the glass fiber, protecting it from shock damage. The main purpose of the secondary coating is to provide a semi-rigid protective shell to protect both the primary coating and the glass fiber from adverse environmental elements, as well as physical damage.

Often these coatings have ultraviolet (UV) photoinitiators in their composition. Photoinitiators function by absorbing energy which is radiated by a UV, or sometimes a visible, light source. This energy absorption then initiates polymerization of the liquid coating placed on the fiber, and accelerates the hardening of the coating. This acceleration greatly reduces the production time of optical fibers, making production more profitable. The curing of the coatings take place in specific UV curing stages during the optical fiber manufacturing process. There are curing "chambers" at these stages which facilitate the curing of the coatings.

Within most of these curing "chambers" there is at least one UV light source which emits UV radiation or light onto the optical fiber coating. It should also be noted that this curing step is also found when manufacturing fiber optic cables or ribbons, when the cable or ribbon matrix or substrate is to be cured around a plurality of fibers. In either application, the basic function and operation of the UV curing chamber remains the same.

As stated earlier, most prior art curing chambers have at least one UV light source or bulb to emit the UV radiation or light. This configuration leads to a very serious problem inherent in prior art curing chambers. Optical fibers, fiber ribbons and fiber cables require curing around the complete circumference of their coatings or matrix materials. Because the coatings are applied concentrically around the fibers, ribbons or cables, the entire 360° around the center line of the fiber, ribbon or cable must be cured evenly. Without an even cure of the coating there will be uneven cure gradients throughout the coating, which leads to inadequate protection of the fibers.

In an effort to avoid the problem of uneven cure around a fiber, ribbon or cable, prior art curing devices use mirrors or reflective surfaces inside the curing chamber to reflect the UV radiation from the bulb back at the surface or coating to be cured. Although this partially addresses the problems associated with the prior art devices, it is a relatively inadequate solution. Primarily, the problems associated with uneven cure gradients in the coatings are not completely avoided. The mirrors or reflectors that are used are not 100% efficient. This means that some of the UV radiation or light emitted from the bulb, which strikes the reflective surface of the mirror, is either absorbed into the surface, or refracted or reflected away from the coating or substrate to be cured. Therefore, some of the UV radiation from the light source is lost and/or not directed at the coating to be cured. Because of this the intensity of radiation is different around the coating or substrate. This difference in intensity translates to different cure states around the coating or substrate, and as stated earlier, this is highly undesirable.

Another significant problem associated with current UV curing chambers is the relatively high heat that is generated from the UV lamps during operation. In most prior art curing chambers the UV light source used does not exclusively emit UV light, but also emits other wavelengths of light like those found in the infrared light spectrum. The infrared (IR) light emitted generates a significant amount of heat in the curing chamber during operation. The generation of this heat leads to a number of problems in the manufacture of optical fibers, ribbons and coatings.

A major problem is due to the fact that the heat generated is added to the heat which already exits from the optical fiber being drawn through a furnace (used to draw a preform into a fiber). This added heat accelerates the curing of the coatings on the fibers, ribbons, and cables, and can lead to the coatings being "over-cured" or improperly cured. "Over-cure" is a situation where the coating or substrate becomes too hard and leads to microbending in the optical fiber which adversely affects the quality of the signal sent through the fiber.

One of the most common solutions used in the prior art to address the problems associated with the high heat generated, is through the use of cooling air in the UV curing chamber. However using cool air to try and control the high heat levels, that can be reached, is not without its problems. First, if air is passed over the coating or substrate being cured the oxygen in the air inhibits proper polymerization and, therefore, proper curing of the coating or substrate. Second, even if the air is not in contact with the coating, but is passed through a cooling "tube" the air inhibits the transmission of the UV radiation to the substrate. Air tends to absorb, reflect, and/or refract a percentage of the UV radiation emitted from the light source used in the chamber. This coupled with the loss of UV radiation in the reflective surfaces (mirrors) used greatly reduces the efficiency of the UV light source requiring more power in the UV light source (and thus more heat) or slowing the curing process. Third, and perhaps most importantly, when UV radiation is passed through air harmful ozone is created through a chemical reaction between the UV radiation and oxygen. The creation of ozone is extremely disadvantageous due to the costs and complexity of the measures required to protect the environment from this ozone.

There have been efforts in the prior art to address some of the problems discussed above, but they fall short. For example, the German Patent DE 39 13519 C2 discloses a UV bulb which is tubular in shape. This allows the bulb to surround the full 360° of the coating or substrate to be cured.

This is to address the problems associated with using a single bulb with a number of reflective surfaces, which can lead to uneven curing around the coating or substrate. This patent also discloses using a UV transparent cooling medium to cool the bulb in an effort to avoid the problems discussed above. However, the patent discloses using a reflector on the exterior of the bulb to reflect radiation that is emitted out from the bulb back at the bulb and, therefore, the substrate or coating to be cured. This aspect of the patent disclosure has some serious drawbacks.

UV bulbs have a high temperature plasma region within the bulb that generates the UV radiation (among other types of radiation, such as IR). Because of this plasma region inside the UV bulb, reflected UV radiation will not be able to pass through the bulb to the substrate or coating. In fact, UV as well as IR radiation reflected back at the bulb is "captured" in the bulb, thus increasing the temperature of the bulb unnecessarily. This increase in bulb temperature adversely affects the efficiency of the cooling medium and systems used. This is because, as the operation of the bulb goes on, the bulb will be steadily increasing its own temperature as the UV and IR radiation is reflected back into the bulb and trapped there because of the plasma in the bulb. This increasing heat, and reduced efficiency of the cooling system will lead to a decrease in the operational life of the bulb and cooling system without any increase in the efficiency in the curing of the coating or substrate, as the reflected UV radiation never reaches the substrate or coating, and is trapped between the bulb and the exterior reflective surface.

SUMMARY OF THE INVENTION

The present invention is directed to eliminating the above problems associated with prior art curing chambers through the use of a new and novel ultraviolet bulb, curing apparatus and curing method.

The present invention avoids the above problems with the prior art by employing a number of new and novel features, which will be discussed briefly here, and in more detail below. First, the present invention employs a UV transparent tube, through which the coated optical fiber or substrate is passed. An inert gas is passed through the center of this tube so as to provide an inert environment free of oxygen, due to the adverse affect oxygen has on the polymerization process of UV curable coatings and substrates. This UV transparent tube and flowing inert gas further acts as an exhaust vessel to blow out volatile gases and emissions generated during the curing of the coating or substrate. This is to minimize the deposit of these volatiles on the surface of the UV transparent tube. The deposition of these volatiles tends to "cloud" the tube, thus reducing the efficiency of the curing process as the UV radiation is blocked and/or dissipated by the "clouding." The inert gas used in this process is either heated or cooled to allow the temperature surrounding the coating to be controlled and changed to ensure optimum efficiency of the curing process.

Second, the present invention further employs a hollow tubular UV bulb which is positioned concentrically around the UV transparent tube and coated fiber or substrate to be cured. The UV tube bulb will avoid the problems in the prior art of uneven curing by providing an evenly distributed UV radiation source completely around the substrate or coating to be cured. In the present invention, the UV tube bulb is large enough to provide a gap between the inner surface of the bulb and the exterior surface of the UV transparent tube. A cooling medium is passed through the gap created between the tube and the bulb to allow active cooling of the UV bulb. However, to avoid many of the problems with the prior art the cooling medium will be of a type transparent to UV radiation, thus allowing the radiation to pass through the cooling medium, remaining unaffected by the cooling medium. This will greatly increase the efficiency over prior art curing methods.

Further, the present invention employs the use of an infrared filter coating placed on either the interior side of the UV tubular bulb or on the UV transparent tube, or both. This coating prevents IR radiation from reaching the substrate or coating to be cured, preventing many of the problems associated with overheating the coating or substrate to be cured. However, this aspect of the invention may not be necessary in situations where the restriction of heat emitted to the coating or substrate is not necessary. This shielding will further increase the efficiency of the bulb by reflecting the IR radiation back into the plasma region of the bulb, thus increasing the activation efficiency of the plasma and, therefore, the bulb's efficiency.

Instead of using a reflector on the outside of the bulb to reflect all of the emitted radiation back into the bulb, including IR and UV radiation, the present invention employs a dichroic reflector that is transparent to most radiation wavelengths, including IR, but reflects the UV radiation back into the bulb. This will prevent the dramatic increases in bulb temperature found in the prior art, by allowing the IR radiation to escape the bulb while avoiding the environmental problems associated with the creation of harmful ozone, due to the reaction of UV radiation with the oxygen in the air surrounding the exterior of the bulb.

Finally, the present invention further increases the temperature control over the UV bulb, and thus its efficiency, by providing an exterior cooling system for the bulb. A fluid or gas cooling medium is flowed or drawn past the exterior of the bulb to provide an additional cooling effect. In an embodiment of this invention this cooling medium is the primary cooling means. By placing the majority of the cooling means on the exterior of the bulb, the flow direction of the heat transfer from the bulb will be primarily outward, not inward towards the inner cooling medium. Therefore, this exterior cooling medium aids in drawing additional heat from the UV bulb away from the coating or substrate to be cured, thus allowing more control over the curing stage and greatly reducing the risks associated with over-cure, or heat damage to the coating or substrate.

BRIEF DESCRIPTION OF THE DRAWINGS

The advantages, nature and various additional features of the invention will appear more fully upon consideration of the illustrative embodiment of the invention which is schematically set forth in the drawings, in which.

DETAILED DESCRIPTION OF THE INVENTION

The present invention will be explained in further detail by making reference to the accompanying drawings, which do not limit the scope of the invention in any way.

Figure 1:
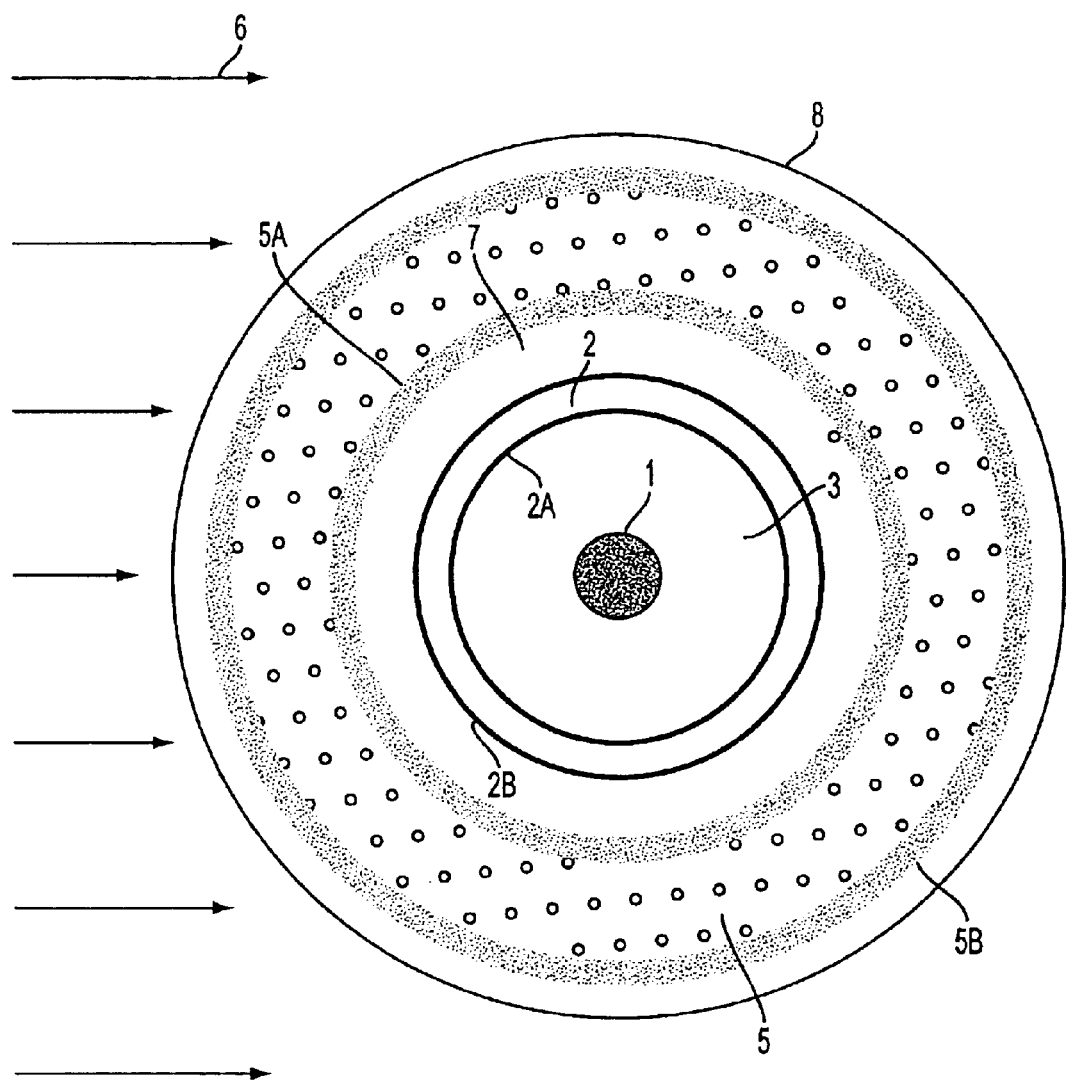
FIG. 1 is a cross-sectional view of an embodiment of the curing apparatus of the present invention.
Figure 2:
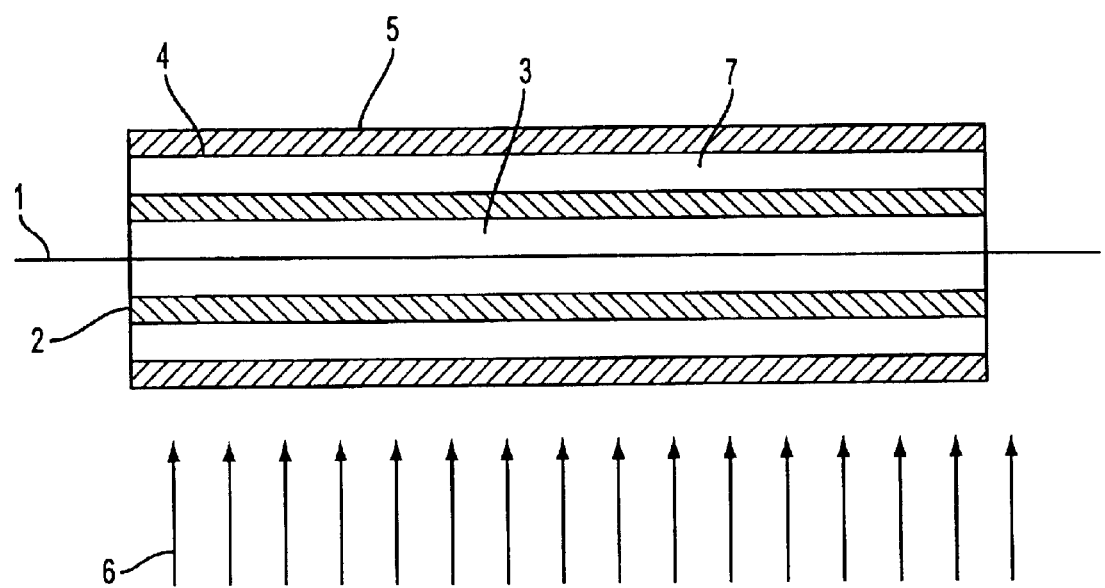
FIG. 2 is a cross-sectional view along the long axis of an embodiment of the curing apparatus according to the present invention.

Referring to the drawings, FIGS. 1 and 2 show a cross-sectional view of a cylindrical embodiment of the curing apparatus of the present invention. In the present invention, a substrate or coated fiber 1 passes through the center line of a cure chamber apparatus. Located concentrically around the fiber or substrate 1 is a UV transparent tube 2. The tube 2 is made from a material, such as quartz, that is transparent to UV radiation. This allows the UV radiation to pass through the tube 2 to the substrate 1, without interference or dissipation, thus ensuring that there is no drop in the efficiency of the curing process due to UV radiation being absorbed in the tube 2.

Additionally, in the preferred embodiment the tube 2 is removable within the curing chamber assembly. This is because various volatiles and vapors are generated and emitted from the coating or substrate materials being cured during the curing process. These vapors and volatiles have tiny particles of impurities, which eventually become deposited on inner surface of the tube 2 during curing. These deposits build up and eventually adversely affect the efficiency of the curing process as they tend to block or further dissipate UV radiation directed towards the substrate or coating 1. Therefore, it is desirable that the tube 2 be easily removable allowing frequent replacement to ensure maximum efficiency of the curing apparatus. In FIGS. 1 and 2 the tube 2 is shown as a circular cylinder, however, the shape of the tube 2 can vary as required by the particular application of the apparatus (such as elliptical cylinder or oval cylinder).

Between the tube 2 and the substrate or fiber 1 a space exists 3. Through this space 3 an inert gas, such as nitrogen, is passed. The passage of an inert gas through this space 3 serves two major purposes. The first purpose is to provide an inert environment which is free from oxygen around the substrate or fiber 1 being cured. If oxygen is present on or near the surface of the substrate or fiber 1 being cured, it will chemically react with the UV curable coatings or materials, thus limiting the desired efficiency of the polymerization (i.e. curing) of the coating materials. This is undesirable as it is necessary for the curing process to be as efficient as possible. The second purpose of the inert gas in the region 3 is to act as an exhaust vessel to blow out or remove as much of the volatiles and vapors emitted from the UV curable materials as possible. As stated earlier, the presence of these vapors and volatiles in the space 3 around the substrate or fiber 1 tend to reduce the efficiency of the UV curing process, as they absorb and deflect some of the UV radiation directed at the substrate or fiber 1. Therefore, the inert gas is used to continuously move the vapors and volatiles out of the space 3 to increase the curing efficiency and decrease the deposition rate of the volatiles on the tube 2. By decreasing the deposition rate of the volatiles on the tube 2, the tube 2 will have to be replaced less frequently, thus increasing the efficiency of the curing apparatus while reducing costs. The inert gas which passes through the space 3 can be either pushed or drawn through the space 3 by any common or conventional method used to pass a gas through a tube.

In the preferred embodiment of the present invention, the inert gas passed through the space 3 can be either heated or chilled depending on the requirements of the curing process. The temperature of the substrate or fiber 1 and the space 3 surrounding the fiber or substrate 1 is often very critical in optimizing the curing or polymerization rate of the coating material being used. For example, when curing the coating on an optical fiber, the optical fiber itself is very hot from the drawing process (which basically involves melting a glass preform and drawing it into a fiber). If a chilled or cooled environment is provided within the space 3 the fiber and coating temperature can be brought down to an optimal temperature for polymerization of the coating. Without this temperature control the coating may become improperly cured because of the residual heat in the glass fiber. This accumulation of the fiber's residual heat with the curing heat causes thermally induced surface irregularities or material property gradients in the cured coating. Because of the importance of the coating in protecting the glass fibers, such irregularities in the coatings are extremely undesirable.

Alternatively, if the substrate 1 to be cured is for an optical fiber ribbon or cable (having a number of already coated and cured optical fibers affixed in a matrix or substrate) there is little or no residual heat, as is associated with the optical fiber drawing process. The fibers are usually at room temperature. In this case it may be desirable to heat up the coating or substrate material to aid in the curing of the material, as heat acts as a catalyst to increase the curing speed of some coating or substrate materials. Therefore, in one embodiment of the present invention the inert gas can be heated (as might be the case for use with ribbons and cables) and in another embodiment the inert gas can be cooled or chilled (as might be the case for use with drawn fibers). Any common or conventional gas temperature control device can be used to regulate and control the temperature of the inert gas passing through the space 3. Further, in the preferred embodiment the inert gas can be either heated or chilled so as to allow the UV curing apparatus to be used in multiple applications.

As shown in FIGS. 1 and 2, a tubular UV bulb 5 is located concentrically around the tube 2 such that a cooling region 7 is created between the inner surface 5A of the UV bulb 5 and the tube 2. The cooling region 7 is flooded with a UV transparent cooling medium that is both chilled and flowing. This cooling medium will allow substantial heat transfer from the bulb 5 into the cooling medium and cooling region 7 so as to ensure that the bulb 5 maintains a stable and efficient operating temperature. High temperatures can damage the bulb 5, the tube 2 and the coating or substrate 1 being passed through the apparatus. It is also important that the cooling medium be UV transparent, such as chilled distilled water or chilled nitrogen gas, to ensure that the cooling medium does not absorb, refract or reflect any of the UV radiation emitted from the bulb 5 towards the substrate or fiber 1. This will ensure maximum UV radiation efficiency. In the preferred embodiment, the cooling medium is chilled nitrogen gas. However, any fluid medium that is transparent to the wavelength of light that is used to activate the photoinitiators or photosensitizers in the UV curable coatings or substrates 1 can be used. Chilled nitrogen gas is preferred because it is extremely UV transparent, it will aid in the extraction of heat from the UV bulb 5, it will provide an oxygen free environment between the bulb 5 and the tube 2, thus avoiding the creation of harmful ozone, and it is relatively inexpensive.

As with the inert gas flowing through the space 3, any conventional or commonly used device or method can be used to flow the cooling medium through the cooling region 7. Further, any common or conventional gas or liquid temperature control device can be used to regulate and control the temperature of the cooling medium as it passes through (or prior to it passing through) the cooling region 7.

In some applications of the present invention it is not necessary to have the cooling medium in the cooling region 7 chilled prior to, or while, it is being flowed past the bulb 5. In these applications, the temperature control of the bulb 5 is not as critical or is being handled by a different method, or when the heat generated by the bulb 5 is desirable. For example, when curing substrate or matrix materials for optical fiber cables or ribbons which do not have residual heat from the drawing process it may be desirable to have additional heat from the bulb 5 to aid curing. In these cases the flowing medium in the cooling region 7 is primarily used to remove oxygen from the environment between the bulb and the substrate (to eliminate the problems associated with the creation of ozone and depleting the UV energy available for curing the substrate).

The bulb 5 is a tubular bulb which can be any cross-sectional shape that is most desirable for the fiber or substrate 1 to be cured. In FIGS. 1 and 2 the shape of the bulb 5 is cylindrical. The fact that the bulb 5 is a tube ensures that there is a complete 360° exposure of the fiber or substrate 1 to the UV radiation emitted from the bulb 5. This will ensure efficient and even curing of the UV curable material. The UV bulb 5 contains elements which, when heated to a plasma by electric current or microwave radiation, radiate UV light in the optimal wavelength ranges required by the photoinitiators or photosensitizers used in the UV curable coatings of the fiber or substrate 1, typically between 250 nm and 450 nm. Excimer gases, such as Xenon or Argon, may be used to provide a narrow bandwidth of wavelength output. Other embodiments of the invention can use bulbs 5 of other types, such as mercury bulbs, metal halide bulbs, or other bulbs containing any performance enhancing additives.

Further, in the present invention the interior surface 5A of the bulb 5, or one or both of the surfaces 2A, 2B of the tube 2, are coated with an infrared (IR) filter (not shown). In fact, in one embodiment of the invention all of the these surfaces 5A, 2A and 2B are coated with the IR filter. The infrared filter is of a type which is either completely, or mostly, transparent to UV radiation to allow the UV radiation to reach the substrate or fiber 1 to be cured, but reflects all, or most of, the other wavelengths of radiation, such as IR radiation back away from the substrate 1. This aspect of the present invention aids in directing non-UV radiation away from the substrate and back at the bulb 5 and the cooling fluid flow through the region 7. This is desirable when it is necessary to restrict the amount of heat added to the environment surrounding the substrate or fiber 1, such as when curing the coating on an optical fiber. In addition to limiting the increase in temperature around the substrate, the shielding reflects wavelengths (IR) back into the bulb 5 which may then be used to increase the efficiency of activation of the plasma within the bulb 5, thus increasing the efficiency of the bulb's 5 output by requiring less energy input to maintain the plasma state. Additionally, when the IR filter coating is applied to the surface 2A or 2B of the tube 2, the IR (heat) will be trapped between the bulb 5 and the tube 2 thus increasing the heat transfer efficiency to the cooling fluid flow 7.

Unlike the prior art, the preferred embodiment of the present invention does not employ a standard reflector on the outer surface of the bulb 5, but instead uses a dichroic reflector 8. The dichroic reflector 8, of the present invention, is transparent to most of the wavelengths transmitted by the bulb 5, but is reflective to the all, or most, of the UV radiation emitted by the bulb 5. Therefore, unlike the prior art, the IR radiation (heat) escapes through the outer surface of the bulb 5, while the UV radiation does not. This prevents the UV radiation from reacting with the oxygen in the air surrounding the exterior of the bulb 5, thus preventing the creation of harmful ozone, while allowing the heat generated by the bulb 5 to be emitted out of the outer surface of the bulb 5. This allows the bulb 5 to be cooled on its outer surface and its inner surface at the same time, greatly increasing temperature control of the bulb 5.

The dichroic reflector 8 can either be a separate reflective surface positioned concentrically around the external surface of the bulb 5 (as shown in FIG. 1), or can be a reflective coating placed on the exterior surface 5B of the bulb 5, similar to the filter coatings used on the tube 2 or the bulb 5. It should be noted however, that the dichroic reflector 8 is not necessary for every embodiment of the present invention, and the invention can operate without such a reflector. The preferred embodiment of the present invention employs the dichroic reflector 8 which is separate from the UV bulb 5, as shown in FIG. 1.

In the preferred embodiment, the dichroic reflector 8 has a plurality of holes or gaps (apertures) throughout its circumference to allow a cooling medium or fluid 6 (discussed in more detail below) to pass through the dichroic reflector 8 and cool the bulb 5. In an alternative embodiment of the present invention, the dichroic reflector 8 has a solid surface (free of holes or apertures), and the cooling medium 6 flows in the gap between the reflector 8 and the bulb 5 in along the long axis of the apparatus, instead of across the apparatus as shown in FIGS. 1 and 2. However, if this alternative embodiment is used and the cooling medium 6 used for the bulb is air or nitrogen, the heat transfer of the bulb to the cooling medium would be relatively inefficient, as the flow pattern shown in FIGS. 1 and 2 is optimal for using cooling air or nitrogen. In this alternative embodiment, the optimal cooling medium to be used in the region between the reflector 8 and the bulb 5 would be a liquid cooling medium, such as water. As with the other cooling mediums used in the various embodiments of this invention, the cooling medium used in the space between the dichroic reflector 8 and the bulb 5 can be cooled by any commonly used or conventional means either prior to or while it is flowing through this space.

Figure 3:
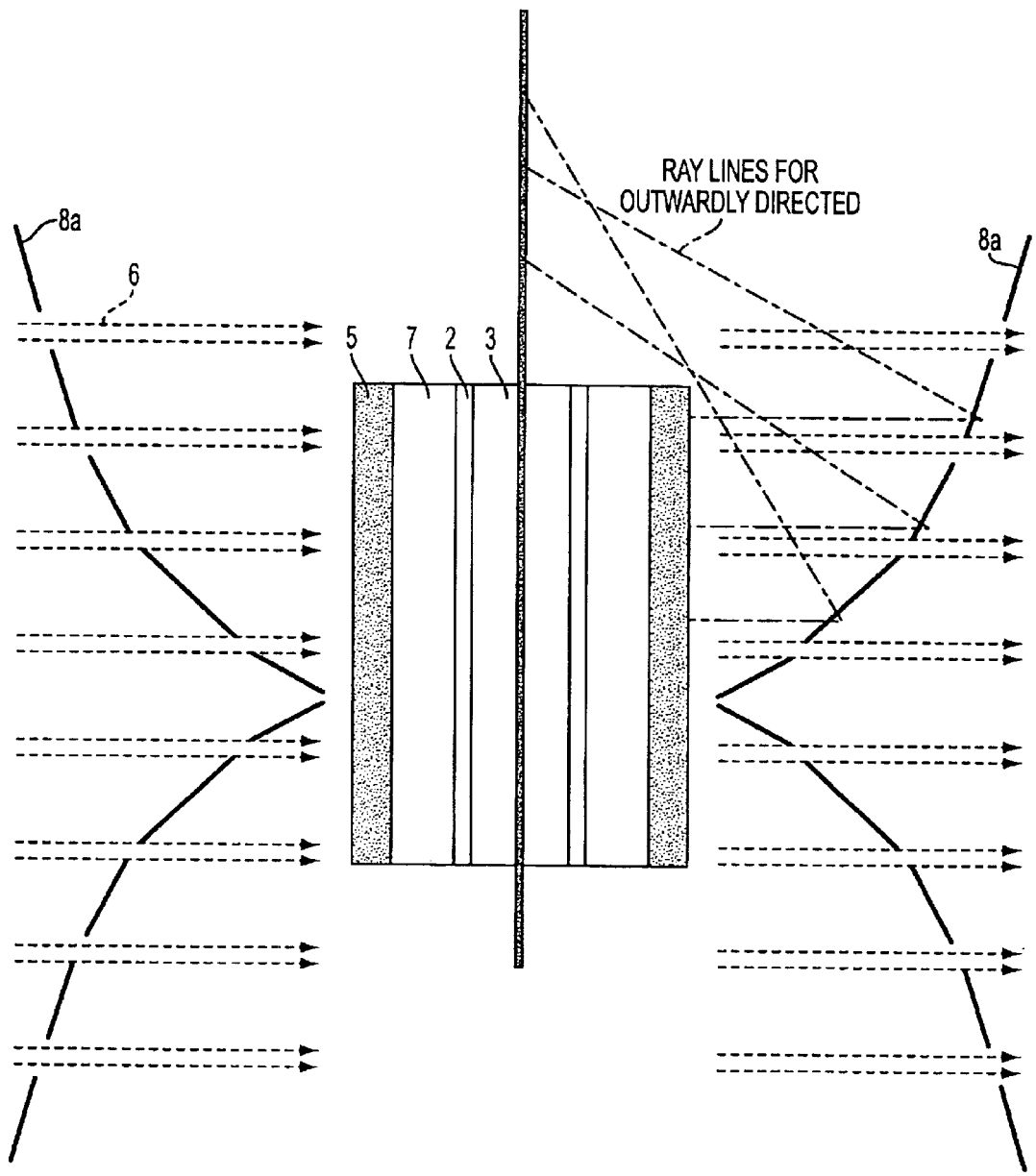
FIG. 3 is a cross-sectional view of another embodiment of the curing apparatus of the present invention.

Another embodiment of the present invention is shown in FIG. 3. In this embodiment the dichroic reflector 8a has a conical or beveled surface or surfaces in place of the cylindrical surface reflector 8 (shown in FIG. 1). (Note that FIG. 3 shows two opposite conical surfaces, however, the present invention is not limited to this configuration and may use a single conical surface reflector.) In this embodiment, some or all of the UV radiation emitted from the outer surface of the bulb 5B is reflected back at the center of the apparatus (i.e. the substrate 1) at an angle such that the reflected UV radiation contacts the surface of the substrate 1 just before entering the bulb cylinder 5 and/or just exiting the bulb 5, as shown in FIG. 3. The intensity of this irradiation will be lower than that of the direct irradiation emitted from the bulb's inner surface 5A, but will still be concentric (360°) around the substrate 1 as long as the reflector surface 8a is designed and maintained properly. If, air, or other non-inert gas is used as the cooling medium 6 (discussed in more detail below), the resulting generation of ozone will deplete the UV energy available for the photopolymerization process. It is possible to use an inert gas for this cooling medium 6, however, the advantage gained by removing the UV energy dissipation associated with ozone generation is likely to be overwhelmed by the cost associated with using an inert gas. The high volume of flow required suggests that air would be the desirable fluid for the cooling medium 6, in this embodiment, and that the UV energy losses would be acceptable when considering the UV energy efficiency improvements gained elsewhere in this design.

In the preferred embodiment of the present invention, the cooling fluid or medium 6 is flowed past, or drawn by, the outer surface of the bulb 5 such that the cooling medium 6 acts as an additional heat sink absorbing heat from the bulb 5. In this embodiment, the bulk of the cooling of the bulb 5 occurs on its exterior surface 5B, and not its interior surface 5A. This is, at least, partially due to the larger surface area on the exterior of the bulb 5 then the interior surface 5A of the bulb 5. Because, in this embodiment, the heat of the bulb 5 is primarily drawn outward instead of inward (heat flows from a high temperature region to a low temperature region at a rate proportional to the difference in the temperatures), heat will be drawn away from the substrate or coating 1 to be cured. This will be enhanced by chilling the cooling medium 6 either prior to or as it flows past the exterior surface of the bulb 5. If the medium 6 is chilled it creates an even larger temperature difference between the bulb 5 and the medium 6, increasing the heat transfer rate and drawing more heat away from the substrate 1.

Additionally, because in this embodiment the bulb 5 is now effectively cooled by two cooling mediums, one internally in the region 7 and one externally by the cooling medium 6, the efficiency of the bulb 5 can be maintained more accurately, thus protecting the substrate or fiber 1 to be cured from undesirable high temperatures, while the longevity of the bulb 5 is increased.

Furthermore, because the dichroic reflector 8 or 8a reflects the majority, if not all, of the UV radiation back into the bulb 5, regular air can be used as the cooling medium 6. Unlike with the cooling region 7, it is not necessary to use an oxygen free inert gas, such as nitrogen, as the cooling medium 6 because most, if not all, of the UV radiation is reflected back into the bulb 5 preventing or limiting the interaction between the oxygen in air and UV radiation (although such a cooling medium can be used). It is important to note that if air (or other another non-inert gas) is used for the cooling medium 6, the generation of ozone will result (but to a much lesser extent than if no reflector was used). However, if properly ventilated, as is the standard for the prior art UV lamps, this ozone will not present a health risk to operators using the lamps. Finally, the reflection of the UV radiation back into the bulb 5 may increase the efficiency of the bulb 5 output by increasing the percentage of plasma being generated.

The present invention will result in an increased curing efficiency of UV curable coatings and substrates for optical fiber production, while reducing the risks associated with over-curing the coatings, creation of harmful ozone and high levels of heat generated within the curing apparatus. Moreover, overall costs associated with the curing process will be reduced, while curing speeds can be increased, as less energy input will be required to reach required performance levels because of the increased curing efficiency and control.

It is of course understood that departures can be made from the preferred embodiments of the invention by those of ordinary skill in the art without departing from the spirit and scope of the invention that is limited only by the following claims. In particular, it should be noted that although FIGS. 1 and 2 depict the UV curing apparatus as cylindrical or circular, it is possible for the apparatus to be of any shape. For example, the tube 2, and bulb 5 can be elliptical or oval in shape so as to be used in conjunction with curing a flat optical fiber ribbon structure. Therefore, the cross-sectional shape of the apparatus (tube 2 and bulb 5) should not be limited to what is shown in the drawings and can be of any desirable shape for the purpose for which it is being used.

We claim:

1. An apparatus for curing an article passing through said apparatus by ultraviolet irradiation, comprising:

a hollow tubular ultraviolet light emitting device having an interior surface and an exterior surface;

an ultraviolet transparent tubular element defining a first space for insertion of an article to be cured, said tubular element being surrounded by said ultraviolet light emitting device defining a second space between an interior surface of said light emitting device and an outermost surface of said tubular element; and means for passing an inert gas through said first space.

2. The apparatus according to claim 1, wherein the tubular ultraviolet light emitting device is cylindrical.

3. The apparatus according to claim 1, wherein the tubular element is removably connected to be easily removed and replaced.

4. The apparatus according to claim 1, further comprising a means to heat the inert gas passing through said first space.

5. The apparatus according to claim 1, further comprising a means to cool the inert gas passing through said first space.

6. The apparatus according to claim 1, further comprising a means to heat or cool the inert gas passing through said first space.

7. The apparatus according to claim 1, wherein a surface of said tubular element is coated with a first shielding layer, said first shielding layer being substantially transparent to ultraviolet light and reflective of infrared light emitted from said tubular ultraviolet light emitting device.

8. The apparatus according to claim 1, wherein the interior surface of said tubular ultraviolet light emitting device is coated with a shielding layer, said shielding layer being substantially transparent to ultraviolet light and reflective of infrared light emitted from said tubular ultraviolet light emitting device.

9. The apparatus according to claim 1, further comprising a dichroic reflector surrounding the exterior surface of said tubular ultraviolet light emitting device, said dichroic reflector reflecting ultraviolet light emitted from said tubular ultraviolet light emitting device.

10. The apparatus according to claim 1, further comprising a means for flowing a first cooling medium through said second space.

11. The apparatus according to claim 10, wherein said first cooling medium is transparent to ultraviolet radiation.

12. The apparatus according to claim 10, wherein said first cooling medium is a gas.

13. The apparatus according to claim 10, wherein said first cooling medium is a liquid.

14. The apparatus according to claim 1, further comprising a means to flow a second cooling medium past the exterior surface of said tubular ultraviolet light emitting device.

15. The apparatus according to claim 9, further comprising a means to flow a second cooling medium past an exterior surface of said dichroic reflector.

16. The apparatus according to claim 15, wherein said dichroic reflector has a plurality of apertures for allowing said second cooling medium to contact the exterior surface of said tubular ultraviolet light emitting device.

17. The apparatus according to claim 14, wherein said second cooling medium is air.

18. The apparatus according to claim 9, further comprising a third space defined between said dichroic reflector and said tubular ultraviolet light emitting device.

19. The apparatus according to claim 18, further comprising a means for passing a second cooling medium through said third space.

20. The apparatus according to claim 19, wherein said second cooling medium is a liquid.

21. The apparatus according to claim 9, wherein said dichroic reflector reflects at least some ultraviolet radiation emitted from the exterior surface of said tubular ultraviolet light emitting device such that said some ultraviolet radiation contacts the surface of an article to be cured prior to said article entering said tubular ultraviolet light emitting device.

22. The apparatus according to claim 9, wherein said dichroic reflector reflects at least some ultraviolet radiation emitted from the exterior surface of said tubular ultraviolet light emitting device such that said some ultraviolet radiation contacts the surface of an article to be cured after said article exits said tubular ultraviolet light emitting device.

23. The apparatus according to claim 9, wherein said dichroic reflector reflects at least some ultraviolet radiation emitted from the exterior surface of said tubular ultraviolet light emitting device such that said some ultraviolet radiation contacts the surface of an article to be cured prior to said article entering said tubular ultraviolet light emitting device and after said article exits said tubular ultraviolet light emitting device.

24. An apparatus for curing an article inserted in said apparatus through ultraviolet irradiation comprising:
a hollow tubular ultraviolet light emitting device having an interior surface and an exterior surface;
a dichroic reflector surrounding said light emitting device, said dichroic reflector reflecting only ultraviolet light;
an ultraviolet transparent tubular element defining a first space for insertion of an article to be cured, said tubular element being surrounded by said ultraviolet light emitting device with a second space provided between the interior surface of said ultraviolet light emitting device and said tubular element.

25. The apparatus according to claim 24, further comprising a means for passing an inert gas through said first space.

26. The apparatus according to claim 25, further comprising a means to cool or heat said inert gas passing through said first space.

27. The apparatus according to claim 24, wherein a surface of said tubular element is coated with a first shielding layer, said first shielding layer being substantially transparent to ultraviolet light and reflective of infrared light emitted from said tubular ultraviolet light emitting device.

28. The apparatus according to claim 24, wherein the interior surface of said tubular ultraviolet light emitting device is coated with a shielding layer, said shielding layer being substantially transparent to ultraviolet light and reflective of infrared light emitted from said tubular ultraviolet light emitting device.

29. The apparatus according to claim 24, wherein the tubular element is removably connected so as to be easily removed and replaced.

30. The apparatus according to claim 24, further comprising a means for flowing a first cooling medium through said second space.

31. The apparatus according to claim 30, wherein said first cooling medium is transparent to ultraviolet radiation.

32. The apparatus according to claim 30, wherein said first cooling medium is a gas.

33. The apparatus according to claim 30, wherein said first cooling medium is a liquid.

34. The apparatus according to claim 24, further comprising a means to flow a second cooling medium past an exterior surface of said dichroic reflector.

35. The apparatus according to claim 34, wherein said dichroic reflector has a plurality of apertures for allowing said second cooling medium to contact the exterior surface of said tubular ultraviolet light emitting device.

36. The apparatus according to claim 34, wherein said second cooling medium is air.

37. The apparatus according to claim 24, further comprising a third space defined between said dichroic reflector and said tubular ultraviolet light emitting device.

38. The apparatus according to claim 37, further comprising a means for passing a second cooling medium through said third space.

39. The apparatus according to claim 38, wherein said second cooling medium is a liquid.

40. The apparatus according to claim 24, wherein said dichroic reflector reflects at least some ultraviolet radiation emitted from the exterior surface of said tubular ultraviolet light emitting device such that said some ultraviolet radiation contacts the surface of an article to be cured prior to said article entering said tubular ultraviolet light emitting device.

41. The apparatus according to claim 24, wherein said dichroic reflector reflects at least some ultraviolet radiation emitted from the exterior surface of said tubular ultraviolet light emitting device such that said some ultraviolet radiation contacts the surface of an article to be cured after said article exits said tubular ultraviolet light emitting device.

42. The apparatus according to claim 24, wherein said dichroic reflector reflects at least some ultraviolet radiation emitted from the exterior surface of said tubular ultraviolet light emitting device such that said some ultraviolet radiation contacts the surface of an article to be cured prior to said article entering said tubular ultraviolet light emitting device and after said article exits said tubular ultraviolet light emitting device.

43. A method for curing an article passing through a curing apparatus with ultraviolet radiation, comprising:
passing an article to be cured through a first space defined by an ultraviolet transparent tubular element;
flowing an inert gas through said first space;
emitting ultraviolet light from a hollow tubular ultraviolet light emitting device having an interior surface and an exterior surface, said tubular ultraviolet light device surrounds said tubular element defining a second space between the interior surface of said ultraviolet light emitting device and an outermost surface of said tubular element;
exposing said article to be cured to said ultraviolet light; and
flowing a first cooling medium through said second space.

44. The method according to claim 43, further comprising cooling or heating said inert gas flowing through said first space.

45. The method according to claim 43, wherein said first cooling medium is an ultraviolet transparent gas or liquid.

46. The method according to claim 43, further comprising cooling said first cooling medium flowing through said second space.

47. The method according to claim 43, further comprising flowing a second cooling medium past the exterior surface of said ultraviolet light emitting device.

48. The method according to claim 43, further comprising reflecting infrared radiation emitted from said tubular ultraviolet light emitting device off of a surface of said tubular element.

49. The method according to claim 43, further comprising reflecting infrared radiation emitted from said tubular ultraviolet light emitting device off of the interior surface of said ultraviolet light emitting device.

50. The method according to claim 43, further comprising reflecting ultraviolet radiation off of a dichroic reflector surrounding the exterior surface of said ultraviolet light emitting device.

51. The method according to claim 50, further comprising flowing a second cooling medium over an exterior surface of said dichroic reflector.

52. The method according to claim 50, further comprising flowing a second cooling medium through a plurality of apertures in said dichroic reflector so said second cooling medium contacts the exterior surface of said ultraviolet light emitting device.

53. The method according to claim 50, further comprising flowing a second cooling medium through a third space defined between said dichroic reflector and said ultraviolet light emitting device.

54. The method according to claim 50, further comprising reflecting at least some ultraviolet radiation emitted from the exterior surface of said tubular ultraviolet light emitting device off of said dichroic reflector such that said some ultraviolet radiation contacts the surface of the article to be cured prior to said article entering said tubular ultraviolet light emitting device.

55. The apparatus according to claim 50, further comprising reflecting at least some ultraviolet radiation emitted from the exterior surface of said tubular ultraviolet light emitting device off of said dichroic reflector such that said some ultraviolet radiation contacts the surface of the article to be cured after said article exits said tubular ultraviolet light emitting device.

56. The apparatus according to claim 50, further comprising reflecting at least some ultraviolet radiation emitted from the exterior surface of said tubular ultraviolet light emitting device off of said dichroic reflector such that said some ultraviolet radiation contacts the surface of the article to be cured prior to said article entering said tubular ultraviolet light emitting device and after said article exits said tubular ultraviolet light emitting device.

* * * * *